United States Patent [19]

Pavlik

[11] Patent Number: 4,916,761
[45] Date of Patent: Apr. 17, 1990

[54] TOILET FLUSH-ECONOMIZER

[76] Inventor: John P. Pavlik, 20411 Lassen St., Chatsworth, Calif. 91311

[21] Appl. No.: 348,289

[22] Filed: May 5, 1989

[51] Int. Cl.⁴ .............................................. E03D 1/14
[52] U.S. Cl. .......................................... 4/324; 4/415; 4/661
[58] Field of Search ............................ 4/324, 415, 661

[56] References Cited

U.S. PATENT DOCUMENTS

| 1,992,381 | 2/1935 | Lyons | 4/324 |
| 3,719,957 | 3/1973 | Riedel | 4/415 X |
| 3,745,591 | 7/1973 | Girten | 4/415 X |
| 4,356,576 | 11/1982 | Gala | 4/661 |

FOREIGN PATENT DOCUMENTS 716236 8/1965 Canada ................................. 4/324

Primary Examiner—Henry J. Recla
Assistant Examiner—R. M. Fetsuga

[57] ABSTRACT

A water saving device for use with a conventional toilet having a movable flush valve component attached by linkage to a flush actuator external to the tank. The device includes a stop-body which is attached to an external wall of the tank such that in actuating the flush actuator, a user's finger, or the like, is caused to contact the stop body before the flush valve reaches a fully-open position thereby allowing a partial flush in duration to be selected by the user.

13 Claims, 2 Drawing Sheets

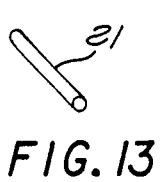
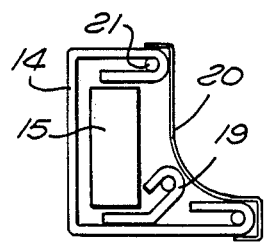
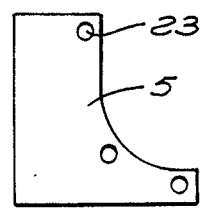
FIG.12　　FIG.13　　FIG.14　　FIG.15
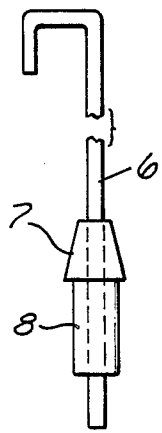
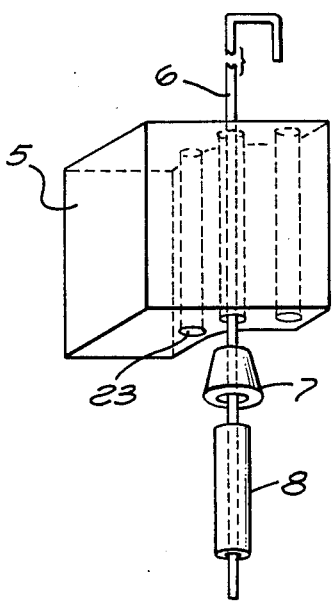
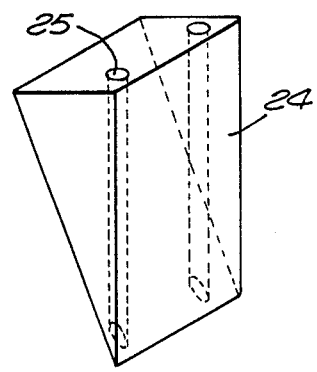
FIG.16　　FIG.17　　FIG.18
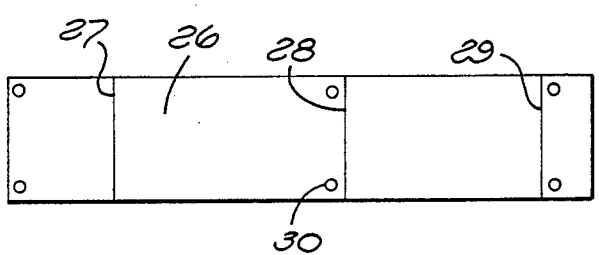
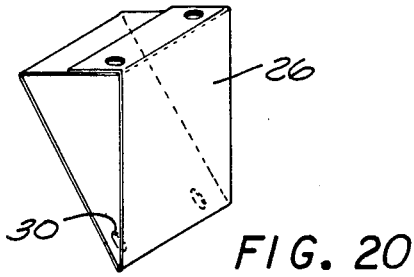
FIG.19　　FIG.20
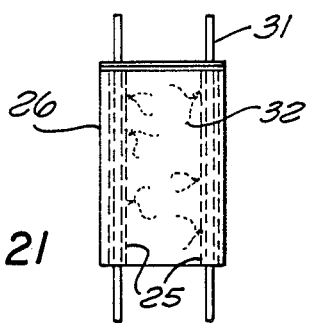
FIG.21

TOILET FLUSH-ECONOMIZER

BACKGROUND OF THE INVENTION

With increasing ecological concerns, there is a great emphasis on conversation of water and minimization of ever-increasing amounts of sewage effluent. The modern conventional domestic flush-toilet wastes water and is a source of excessive volume of sewage effluent. The domestic flush toilet is flushed by moving the external control of a lever mounted on the flush tank to a stop within the lever mechanism and immediately releasing it so as to cause the in-tank arm of the lever to momentarily rise, lift an attached thereto moveable component of the tank flush valve up off its seat to allow a down-rush of flush water. The now unseated and unsupported moveable component of the flush valve is held in an open position at the periphery of the down-rushing column of flush water until down rush of water ceases; whereupon, the moveable component of the flush valve falls back upon the valve seat due to gravity. Such a full flush, uncontrolled once started, is always a waste of water and a source of excessive sewage effluent when only urine is flushed; it is often a waste of water and a source of excessive sewage effluent when solid matter is flushed. The instant invention satisfies a need for control of the flushing water so as to stop it at will when contents of the toilet bowl are seen to have been adequately flushed.

SUMMARY OF THE INVENTION

The instant invention is inexpensive, easily installed, has no moving parts and therefor cannot malfunction. It does not require modification of the original flush mechanism; it is augmentive so as to provide an additional means of flushing. The instant invention is a small, firm body with adjustable means of positioning it on the external surface of a toilet flush-tank wall so that the external lever-arm control, that is moved by the flush operator, passes closely by it during the flushing process but does not contact it. The vertical position of this small body is adjustable so when the finger of the flush operator is allowed to extend a bit over the edge of the external lever-arm control the finger will contact and rest on the small body at a point in the finger and control movement at which the in-tank arm of the flush lever is holding the suspended therefrom moveable component of the flush valve raised in part open position in the path of down-rushing flush water. When flush operator sees that flush is complete the operator's release of external lever-arm control from stopped position at the stop-body will cause the down-rushing flush water to slam the now unseated and unsupported moveable component of flush valve down on its seat and stop the flushing. This small firm stop-body is molded with one side curved to approximately fit the exterior corner of a toilet flush tank without interfering with the path of the rotation of the external lever-arm control. It's attachment to the tank at the required position is by suspensor wires that are formed into crooks at one end to fit over and be moveable along the rim of the flush tank. Stop-body can be positioned horizontally as required by positioning of hooked ends of suspensor wires along rim of the tank and can be positioned vertically as required by positioning along the length of the suspensor wires. Non-curved sides of the stop body are so proportioned that if it is inverted in its suspension from the wires it will still fit the tank corner but its non-curved sides will be distanced differently from the tank corner. This option of inverting the stop-body on the same suspensor wires allows more universal application because there are slight variations among tanks in the position of the external lever-arm control relative to the tank corner. For the small percentage of domestic toilet tanks with external lever-arm control situated on the side of a tank rather than in front near the corner an embodiment of this invention uses a stop-body that is wedge shaped and invertable. When the wedge shaped stop-body is positioned with most acute angle down, a flat horizontal surface is obtained in proximity to the path of a rotating type side mounted external lever-arm control. Stop-body positioned with most acute angle up is moveable along suspensor wires so that thickness of the wedge section proximal to a side mounted push-button type external lever-arm control is adequate to stop a pushing finger when the toilet flush valve is partly open.

One object of this invention is ecological—to conserve water and diminish the volume of sewage effluent.

Another object of this invention is economical—to decrease domestic water bills, sanitation fees and taxes.

BRIEF DESCRIPTION OF THE DRAWINGS

FIG. 12 is a side view of a sheet of metal that is not a component of the instant invention but is used as a curve form in molding the stop-body.

FIG. 13 is a perspective view of one of three similar rods that are not a part of this invention but are used to mold three passages in the stop-body of this invention.

FIG. 14 is a side view of components of stop-body of the instant invention shown in FIG. 11 positioned for the molding process with the molding forms shown in FIGS. 12, 13.

FIG. 15 is a plan view of the stop-body conponent of this invention after molding material has been filled into the assembly shown in FIG. 14 and molding-process forms shown in FIGS. 12 and 13 have been removed.

FIG. 16 is a side view of the compression-brake component of this invention positioned on a suspensor-wire component of this invention.

FIG. 17 is a perspective view showing the stop-body, one suspensor-wire and one compression-brake components of this invention.

FIG. 18 is a side view showing a stop-body embodiment of the instant invention for tanks with side-mounted external lever-arm control.

FIG. 19 is a plan view of a sheet of metal with bend lines whereby a wedge shaped mold is made.

FIG. 20 is a perspective view of a wedge shaped mold produced by bending the sheet of metal in FIG. 19 on bend lines shown in FIG. 19.

FIG. 21 is a front elevational view of the hypotenuse of the mold form shown in FIG. 20 assembled with two passage tubes, six wire anchors and two holding wires in preparation for molding the stop-body.

DESCRIPTION OF THE PREFERRED EMBODIMENTS

For a better understanding of the instant invention reference is made to the following description taken in connection with the accompanying drawings and its scope will be pointed out in the appended claims.

Figure 5:
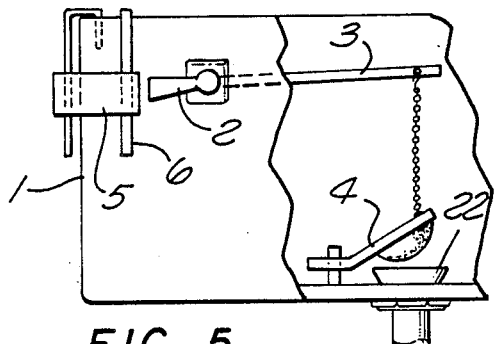
FIG. 5 is a fragmentary front view of a conventional domestic toilet flush tank showing only the tank components comprising the flush mechanism and showing the relative positions of the stop-body of the invention and the external lever-arm control when moveable component of the flush valve is part open.

FIG. 5 shows the flushing mechanism components 2,3,4,22 of a conventional domestic toilet flush-tank of the type used with a conventional domestic toilet bowl. The toilet bowl is flushed when external lever-arm control 2 is moved fully to a stop in the lever mechanism and immediately released so that the in-tank arm 3 of the flush lever will rise momentarily far enough to raise the suspended therefrom moveable component 4 of the flush valve off its seat 22 high enough to maintain it in full open position. When the powerful down-rush of water ceases the moveble component 4 falls back on its seat 22 due to gravity. Shown in FIG. 5 in working relationship with flush mechansism of a domestic toilet flush tank are the stop-body 5 and suspensor wires 6 components of the instant invention. External lever-arm control 2 of the flush lever is shown moved down just far enough to raise the in-tank arm 3 of flush lever up just enough to raise moveable component 4 of flush valve into part open position. The index of this part open position is the positioning of external lever-arm control 2 so that its top surface is approximately even with the top surface of the stop-body 5 that is fixedly positioned close to the path of movement of the control 2. The stop-body 5 is positioned to satisfy this spatial relationship and fixed in place by means of suspensor wires 6 of FIGS. 1, 2, 3, 4, 5 and 17 that hang vertically from the rim of a flush tank 1 wall by crooks in their upper ends and are passed through vertical passages 23 of FIG. 17 in the stop-body 5 of FIGS. 1, 2, 3, 4, 5 and 17 so that the stop-body 5 can be positioned vertically as required along the length of the wire and positioned horizontally as required by movement of crooked ends of suspensor wires 6 of FIGS. 1, 2, 3, 4, 5 along the rim of the tank 1. The stop-body 5 of FIGS. 1, 2, 3, 4, 5 is held in chosen vertical position by a compression-brake device shown in FIGS. 16 and 17 as 7,8 comprising one hollow cone-shaped component 7 with a hole in its apex slipped onto each suspensor wire 6 of FIGS. 1, 2, 3, 4, 5, 17 protruding below stop-body 5 so that apex of each cone is in contact with the bottom of stop-body 5. A short length of pliable tubing 8 of FIGS. 16, 17 with outside diameter less than diameter of mouth of cone 7 of FIGS. 16, 17 and internal diameter to fit snuggly but moveably along a suspensor wire is slipped on each wire 6 and pushed up into the mouth of the cone 7 of FIGS. 16, 17. Downward pressure on the stop-body 5 as shown in FIG. 17 will move cone 7 down on pliable tubing 8, compress it and stop downward movement of cone 7 and stop-body 5. With the stop-body 5 fixedly positioned at such elevation close to movement of control 2 so top surface of both stop body 5 and control 2, FIG. 5, will be about even when movement component 4 is part open and in the path of down-rushing flush water the tip of the finger that flush operator uses to push control 2 can contact the stop-body 5, rest on it and hold the moveable component 4 in part open position in path of down-rushing flush water. Release of control 2 from this stopped position at stop-body 5 releases the suspended support of moveable component 4 of FIG. 5 by in-tank arm 3 of flush lever and allows down-rushing flush water to slam the moveable component 4 down on its seat 22 to stop the water flow. No original flush mechanism needs to be altered or interfered with. A tank fitted with the instant invention can still be flushed as it was before its installation.

Each suspensor wire 6 of FIGS. 1, 2, 3, 4, 5, 16, 17 is made from 14 gauge stainless steel wire 6" long held vertically and bent at the top with two 90 degree bends into a crook so that the cross member and the small downward leading length each measure ½", leaving a main vertical member about 5" long.

Figure 1:
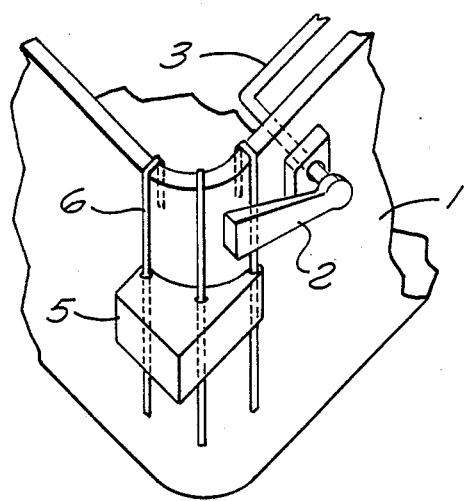
FIG. 1 is a fragmentary view in perspective of a conventional domestic toilet flush tank showing the stop-body and suspensor-wires components of the instant invention.
Figure 2:
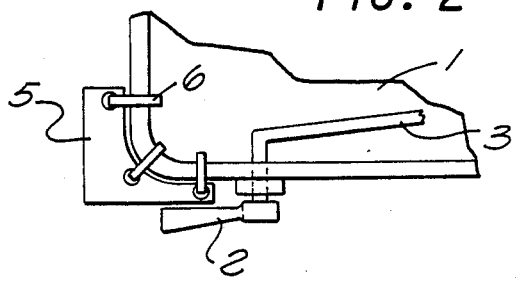
FIG. 2 is a fragmentary plan view showing components shown in FIG. 1.
Figure 3:
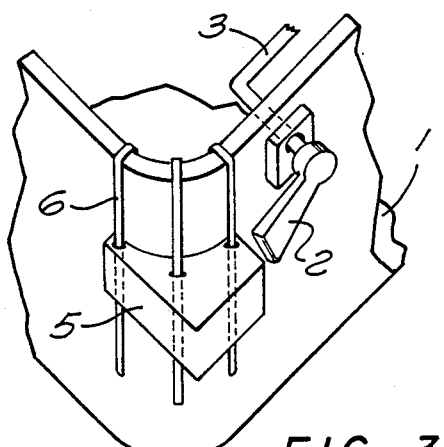
FIG. 3 is a fragmentary view in perspective of a conventional domestic toilet flush tank showing external lever-arm control a short distance farther to the right from the corner of the tank than shown in FIG. 1 and showing the stop-body of the invention inverted from the position shown in FIG. 1 so as to accommodate the more distal from tank-corner location of the external lever-arm control.
Figure 4:
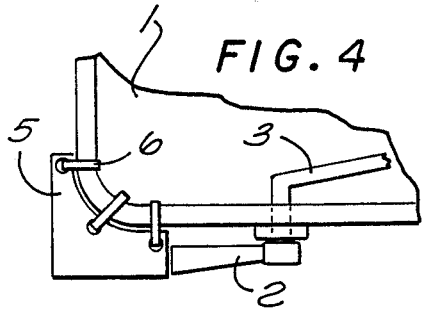
FIG. 4 is a fragmentary plan view of the components shown in FIG. 3.
Figure 6:
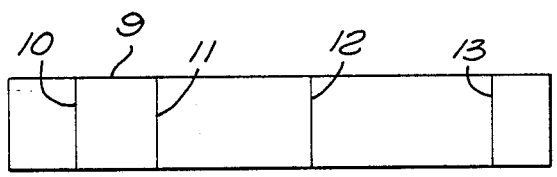
FIG. 6 is a plan view of a sheet of metal showing lines on which it is to be bent to form the external frame for the stop-body.
Figure 8:
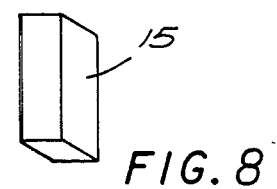
FIG. 8 is a perspective view of a small block of wood that is used as light-weight, inexpensive filler in molding the stop-body.
Figure 10:
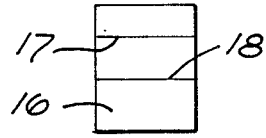
FIG. 10 is a plan view of a sheet of metal that is smaller than the one shown in FIG. 6 showing lines on which it is to be bent to form the middle passage of the stop body.

The stop-body 5 is made of 4 components:

1. a rectangular sheet of galvanized metal approximately 1/64" thick, 1"×4½", FIG. 6, 2. a rectangular sheet of galvanized metal approximately 1/64" thick, 1"×1¼", FIG. 10, 3. a block of soft wood with all sides rectangular, four of the sides measuring ½"×⅞", defining the two ends to each be ½"×½", FIG. 8

4. any casting substance such as plaster of Paris.

Figure 7:
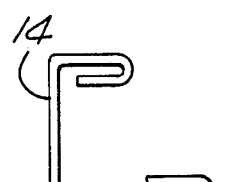
FIG. 7 is a side view showing the sheet of metal shown in FIG. 6 after it has been bent to form the external frame for the stop-body.
Figure 9:
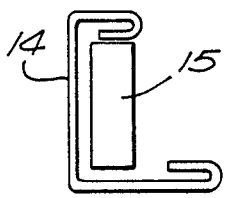
FIG. 9 shows a side view of the filler block shown in FIG. 8 installed within the external frame of stop-body shown in FIG. 7.
Figure 11:
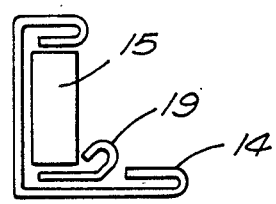
FIG. 11 is a side view showing the sheet of metal shown in FIG. 10, after it has been bent to form the middle passage of the stop-body, positioned with the external frame shown in FIG. 7 and the filler block shown in FIG. 8 for the molding process that will produce the stop-body component of this invention.

The 4½"×1" metal sheet, 9 of FIG. 6, is marked with 4 lines for bending. All bend lines are parallel to the 1" sides. Line 10 is ½" from one of the short sides, line 11 is 1¼" from the same short side, line 12 is 2¼" from the same short side and line 13 is 4" from the same short side. Lines 10 and 13 are bent with 180 degrees rotation so that the parallel members of each bend are about ⅛" apart, FIG. 7. Lines 11 and 12 are each bent with 90 degrees rotation to produce the form shown in FIG. 7 which becomes the external frame 14 of the stop-body, 5 of FIGS. 1, 2, 3, 4, 5. A block of soft wood with 4 rectangular sides each measuring ½"×⅞" is made, 15 of FIG. 8, and set within the external frame 14, FIG. 9. An approximately 1/64" thick rectangular sheet of galvanized metal 1"×1¼", 16 of FIG. 10, is marked for bening by drawing lines 17 parallel to and ⅜" from one of the 1" sides and 18 parallel to and 6/8" from the same 1" side. Line 17 is bent with a 180 degree rotation so that both members of the bend are approximately ⅛" apart and line 18 is bent with a rotation of 45 degrees to produce a middle passage form shown as 19 in FIG. 11. As shown in FIG. 11, the external frame 14, filler block 15 and middle passage form 19 are assembled on a flat surface that has been covered with cellophane or waxed paper so that, observed from above, the assembly presents the view shown in FIG. 11. Under pressure from the exterior frame 14 the filler block 15 will fit snuggly in place and also hold the middle passage form 19 in place. A rectangular sheet of approximately 1/64" thick galvanized sheet metal 1"×2" is bent to produce a contour form that approximates the side view figure shown as 20 of FIG. 12 so it can contact and enclose all three of the 180 degree bends shown in FIG. 14. Wax or oil is applied to the convex side of the contour form, 20 of FIG. 12. Because of its curvature the contour form 20 will sit in place when added to the assembly shown in FIG. 11 to form the assembly shown in FIG. 14. Three 1⅛" lengths of 12 gauge steel wire, one of which is shown as 21 in FIG. 13, are coated with heavy wax or molten paraffin and one of each so coated rods is set in each 180 degree bend as shown in FIG. 14. Several weights are placed against the external frame 14 and the contour form 20 to hold them as positioned in FIG. 14. Plaster of Paris is poured within the confines of the external frame 14 and the contour form 20 so as to fill all of the voids between the enclosed parts. After an adequate setting-up period the assembly is inverted and any unfilled voids are filled with Plaster of Paris. After an adequate setting-up period the weights and contour form are removed and the three rods 21 are removed by twisting and pulling. The product of this molding-casting process is the stop-body component of this invention, 5 of FIGS. 1, 2, 3, 4, 5, 15 and 17 with three strong passages shown in FIGS. 15, 17 as 23.

A length of ⅛" copper tubing is flared and the flared section is cut off so as to include about ⅛" of unflared tubing. This flared segment of tubing constitutes the hollow cone component, 7 of FIGS. 16, 17, of the compression-brake component of this invention. A ½" length of rubber tubing with diameter to fit snuggly but moveably on the 14 gauge suspensor wires 6 and external diameter less than width of mouth of the cone 7 is slipped onto the suspensor wire 6 and into mouth of cone to produce the compression-brake component of this invention—7,8 of FIGS. 16, 17. Three such cones and lengths of tubing are the means of adjusting the stop-body 5 of FIGS. 1, 2, 3, 4, 5, 17 at any required position along the suspensor wires 6.

For the small percentage of domestic toilets that have either a rotating or push-button external lever-arm control on the side rather than front of the tank one of the embodiments of the instant invention has a stop-body, 24 of FIG. 18, shaped like a wedge. This stop-body utilizes the same suspensor wires 6 and compression-brake 7,8, FIG. 16 of this invention. For a rotating external lever-arm control the stop-body 24 is suspended with the most acute wedge angle down so as to present a flat surface to the finger of flush operator. Where a push-button control is used the stop-body, 24 of FIG. 18, is suspended with most acute angle up, at an elevation at which the thickness of the wedge where it adjoins the push-button is enough to stop finger of operator when moveable component of flush valve has been partly opened by flush operator's pressure on push-button.

The wedge shaped stop-body, 24 of FIG. 18, is made of plaster of Paris and two metal or rigid plastic tubes 1⅜" long, ⅛" internal diameter, each with three 2" lengths of copper wire twisted onto it, and is fabricated by using a sheet metal form and two three inch long 14 gauge steel wires. A rectangular sheet of galvanized metal approximately 1/32" thick, ¾"×5⅜", 26 of FIG. 19, is marked with bend lines parallel to the ¾" sides. Bend line 27 is 1" from a ¾" side, bend line 28 is 3⅛" from the same ¾" side and bend line 29 is 4⅜" from the same ¾" side.

Six 3/32" holes 30 are drilled in the sheet 26 as shown in FIG. 19. Within each angle formed by the ¾" side of the sheet proximal to bend line 27 and the two 5⅜" sides a 3/32" hole is drilled ⅛" from the arms of the angle. Within each angle formed by the ¾" side proximal to bend line 29 and the two 5⅜" sides a 3/32" hole is drilled ⅛" from each 5⅜" side and ⅜" from the ¾" side. One 3/32" hole is drilled ⅛" from each 5⅜" side at a distance of 2" from bend line 27.

A bend at line 27 is rotated 60 degrees, a bend at line 28 is rotated 30 degrees and a bend at line 29 is rotated 90 degrees to produce a form shown as 26 of FIG. 20. As shown in a front view, hypotenuse FIG. 21, a 1⅜" long metal or rigid-plastic tube of ⅛" internal diameter 25 is placed between each hole at a 30 degree bend and a proximal hole at a 90 degree bend and a straight 3" length of 14 gauge steel wire 31 is pushed through each set of holes and their abutting and wedged-between tubes so as to lock the tubes in position for the casting process, FIG. 21. Three 2" lengths of 20 gauge copper wire 32 are twisted onto each tube 25 to serve as anchors in the plaster, FIG. 21.

All inner flat surfaces of the wedge casting form, 26 of FIGS. 20, 21 are coated with oil or wax with care not to coat tubes 25 or anchor wires 32.

A smooth, flat surface is covered with cellophane or wax paper and the assembly shown in FIG. 21 is laid onto the surface with one of its open triangular ends down in contact with the covered flat surface. Plaster of Paris is poured into the now up-facing other open triangular end. After an adequate setting period the 3" length wires 31 are removed, the wedge casting form 26 is removed and a stop-body 24 shown in FIG. 18 has been produced.

What is claimed is:

1. A water saving device for use with a conventional domestic toilet flush tank having a bowl, said tank being of the type which is flushed by an external flush actuator attached to an internal linkage to which a seated movable component of a flush valve is flexibly connected so that movement of the flush actuator in one direction causes the linkage to rise and lift the movable component off its seat so as to open the flush valve thereby releasing flushing water into the toilet bowl, said flush actuator having a contact surface and being sized and shaped so as to travel in a predetermined path when the flush actuator is actuated to flush the toilet, the device comprising:

a rigid stop-body; and, means for fixedly attaching said stop-body on an external wall of the tank close to but not intersecting said predetermined path of travel of the flush actuator such that a contact surface of the stop-body is substantially aligned with the contact surface of the flush actuator when the flush actuator is actuated to move the flush valve to a partly-open position whereby a user is given indication of the partly-open position of the flush valve through simultaneous contact with the contact surfaces of both the flush actuator and the stop-body thereby allowing the flush valve to be held partly open for a user selected flush time.

2. A device as defined in claim 1 wherein said stop-body is adapted to conform to an exterior corner of the flush tank.

3. A device as defined in claim 1 wherein said stop-body is wedge-shaped.

4. A device as defined in claim 1 wherein said attaching means comprises double-sided adhesive means.

5. A device as defined in claim 4 wherein said stop-body is adapted to conform to an exterior corner of the flush tank.

6. A device as defined in claim 4 wherein said stop-body is wedge-shaped.

7. A device as defined in claim 1 wherein said attaching means comprises a plurality of vertically disposed suspension wires including means for attaching one end portion of said wires to the flush tank and means for attaching the other end portion of said wires to said stop body.

8. A device as defined in claim 7 wherein said stop-body is adapted to conform to an exterior corner of the flush tank.

9. A device as defined in claim 7 wherein said stop-body is wedge-shaped.

10. A device as defined in claim 7 wherein said one end portion attaching means comprises hooks formed in said one end portion of said wires adapted to engage an upper rim of the flush tank.

11. A device as defined in claim 10 wherein said stop-body includes a plurality of holes therein correspondingly receiving said wires therethrough and said other end portion attaching means comprises means for limiting downward movement of said stop-body with respect to said wires.

12. A device as defined in claim 11 wherein said limiting means comprises bends in said wires disposed below said stop-body.

13. A device as defined in claim 11 wherein said limiting means comprises a plurality of hollow truncated cones each having a central bore in the apex thereof for receiving said wires therethrough, and corresponding plurality of pliable tubular members having an inner diameter which snugly but movably receives said wires and an outer diameter which is receivable at least partly into the base of said cone, whereby said cones are slid into said wires below said stop body followed by said tubular members.

* * * * *